United States Patent
Patil et al.

(10) Patent No.: US 11,162,012 B2
(45) Date of Patent: Nov. 2, 2021

(54) WELL TREATMENT FLUID HAVING BIODEGRADABLE FLUID LOSS CONTROL AGENT

(71) Applicant: Halliburton Energy Services, Inc., Houston, TX (US)

(72) Inventors: Sandip Prabhakar Patil, Pune (IN); Ganesh Shriniwas Pangu, Pune (IN); Tamal Kumar Sen, Kolkata (IN); Samuel Lewis, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/841,068

(22) Filed: Apr. 6, 2020

(65) Prior Publication Data

US 2021/0309907 A1    Oct. 7, 2021

(51) Int. Cl.
| | | |
|---|---|---|
| *C09K 8/40* | (2006.01) | |
| *C09K 8/42* | (2006.01) | |
| *C09K 8/16* | (2006.01) | |
| *C09K 8/14* | (2006.01) | |
| *C09K 8/24* | (2006.01) | |
| *C09K 8/035* | (2006.01) | |
| *C09K 8/20* | (2006.01) | |

(52) U.S. Cl.
CPC .............. *C09K 8/424* (2013.01); *C09K 8/035* (2013.01); *C09K 8/145* (2013.01); *C09K 8/16* (2013.01); *C09K 8/203* (2013.01); *C09K 8/24* (2013.01); *C09K 8/40* (2013.01)

(58) Field of Classification Search
CPC ........ C09K 8/424; C09K 8/035; C09K 8/145; C09K 8/16; C09K 8/203; C09K 8/24
See application file for complete search history.

(56) References Cited

U.S. PATENT DOCUMENTS

| | | | | |
|---|---|---|---|---|
| 4,703,801 | A * | 11/1987 | Fry ........................ | C04B 24/18 |
| | | | | 106/719 |
| 4,940,764 | A * | 7/1990 | Meister ................. | C08F 289/00 |
| | | | | 527/400 |
| 8,227,381 | B2 * | 7/2012 | Rodrigues .............. | C09K 8/467 |
| | | | | 507/90 |
| 8,802,748 | B2 | 8/2014 | Assmann et al. | |
| 2003/0230407 | A1 * | 12/2003 | Vijn ...................... | C04B 24/287 |
| | | | | 166/292 |
| 2008/0020948 | A1 * | 1/2008 | Rodrigues ................ | C02F 5/10 |
| | | | | 507/112 |

(Continued)

FOREIGN PATENT DOCUMENTS

WO    2014006002 A1    1/2014

OTHER PUBLICATIONS

Joshi et al., Biodegradation of Polyacrylamide and its Derivatives, Apr. 14, 2017, Environ. Process, 4:463-476 (Year: 2017).*

*Primary Examiner* — Angela M DiTrani Leff

(74) *Attorney, Agent, or Firm* — McAfee & Taft

(57) ABSTRACT

A method of treating a well that includes introducing a well treatment fluid into the well, and a well treatment fluid, are provided. The well treatment fluid comprises an aqueous base fluid, a bridging agent, a viscosifying agent, and a water soluble, biodegradable graft copolymer. In one embodiment, for example, the method is a method of cementing a casing in a well. In this embodiment, the well treatment fluid is a cement spacer fluid.

18 Claims, 2 Drawing Sheets

(56) References Cited

U.S. PATENT DOCUMENTS

| | | | |
|---|---|---|---|
| 2010/0240802 A1* | 9/2010 | Matzinger | C04B 24/287 523/130 |
| 2011/0132605 A1* | 6/2011 | Sarap | C04B 24/2641 166/293 |
| 2011/0308800 A1* | 12/2011 | Sarap | C04B 28/02 166/293 |
| 2012/0305250 A1 | 12/2012 | Burts, Jr. et al. | |
| 2013/0261032 A1* | 10/2013 | Ladva | C09K 8/487 507/131 |
| 2018/0362840 A1* | 12/2018 | Meher | E21B 43/283 |
| 2020/0299563 A1* | 9/2020 | Sodhi | C04B 24/122 |

\* cited by examiner

WELL TREATMENT FLUID HAVING BIODEGRADABLE FLUID LOSS CONTROL AGENT

BACKGROUND

Well treatment fluids are pumped into the well and/or circulated through the wellbore of an oil and gas well in connection with a variety of operations including, for example, drilling operations, cement operations, completion operations and stimulation operations. The components of a particular well treatment fluid and the resulting properties of the fluid will vary depending on the application, well conditions and other factors known to those skilled in the art.

For example, in drilling a well, an aqueous-based drilling fluid (commonly referred to as a drilling mud) is circulated from the surface through the drill string and drill bit and back to the surface through the annulus between the drill string and the borehole wall. The drilling fluid functions, for example, to cool, lubricate and support the drill bit, remove cuttings from the wellbore, control formation pressures, and maintain the stability of the wellbore.

As another example, in a primary cementing operation, a string of pipe such as a casing or liner (collectively referred to herein as a "casing") is placed in a wellbore and cemented in place therein. A hydraulic cement composition is circulated into an annular space between the wall of a wellbore and the exterior of the casing (the "annulus") by pumping the cement composition into the interior of the casing and upwardly therefrom into the annulus. The cement composition is allowed to set in the annulus thereby forming an annular sheath of hardened, substantially impermeable cement therein. The cement sheath physically supports and positions the casing in the wellbore and bonds the exterior surface of the casing to the wall of the wellbore, whereby undesirable migration of fluids between zones or formations penetrated by the wellbore is prevented.

Prior to a primary cementing operation, an aqueous-based spacer fluid is circulated through the wellbore to separate drilling fluid in the casing and annulus from the cement composition and prepare the casing and formation for the cementing operation. For example, the spacer fluid functions to displace and clean out drilling mud and other materials in the casing and the annulus prior to injection of the lead cement composition into the well. The spacer fluid can also be used to condition the casing and annulus to form a good bond with the cement. Spacer fluids can be used to separate fluids in other applications as well.

A common problem in many drilling and other well treatment operations is fluid communication between the fluid in the wellbore and fluid (e.g., water and/or gas) in one or more zones of a subterranean formation penetrated by the wellbore. Such fluid communication can result in migration of the water, gas and/or materials (e.g., sand) contained thereby into the wellbore and thereby cause undesired water production, gas production, sand production, scale formation, corrosion and/or other problems that adversely impact the operation being carried out and/or the ultimate production of hydrocarbons from the well.

An additional problem that can be encountered in well treatment operations is loss of the well treatment fluid from the wellbore into one or more zones of a subterranean formation penetrated by the wellbore (e.g., depleted zones, zones having naturally occurring fractures, and unconsolidated or weak zones having fracture gradients below the hydrostatic pressure created by the drilling or other well treatment fluid (collectively "thief zones")). The partial or complete loss of the drilling fluid, cement composition or other well treatment fluid to one or more thief zones, referred to herein as fluid leak-off or lost circulation, can make it difficult to complete the drilling process, cementing job or other treatment operation.

In order to control migration of fluids into the wellbore, fluid leak-off and/or lost circulation, one or more fluid loss control agents are often added to drilling fluids, spacer fluids, cement compositions, and other well treatment fluids. For example, one or more fluid loss control agents can be added to a cement spacer fluid to reduce or prevent migration of fluids into the wellbore, fluid leak-off and/or lost circulation with respect to the cement spacer fluid itself as well as the subsequently injected cement composition.

Due to the various applications for well treatment fluids that include fluid loss control agents and the differing conditions that can occur in association therewith, there is an ongoing need for new and improved well treatment fluids and associated fluid loss control agents.

BRIEF DESCRIPTION OF THE DRAWINGS

The drawings included with this application illustrate certain aspects of the embodiments described herein. However, the drawings should not be viewed as depicting exclusive embodiments. The subject matter disclosed herein is capable of considerable modifications, alterations, combinations, and equivalents in form and function, as will be evident to those skilled in the art with the benefit of this disclosure.

DETAILED DESCRIPTION

Figure 1:
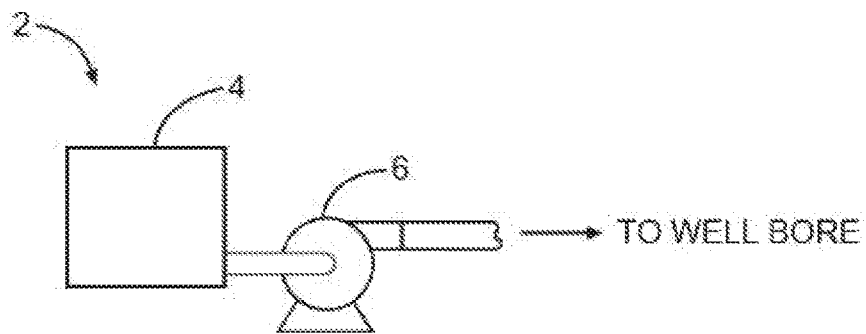
FIG. 1 illustrates a system for preparation and delivery of a cement composition to a wellbore in accordance with aspects of the present disclosure.

The present disclosure may be understood more readily by reference to this detailed description as well as to the examples included herein. For simplicity and clarity of illustration, where appropriate, reference numerals may be repeated among the different figures to indicate corresponding or analogous elements. In addition, numerous specific details are set forth in order to provide a thorough understanding of the examples described herein. However, it will be understood by those of ordinary skill in the art that the examples described herein can be practiced without these specific details. In other instances, methods, procedures and components have not been described in detail so as not to obscure the related relevant feature being described. Also, the description is not to be considered as limiting the scope of the examples described herein. The drawings are not necessarily to scale and the proportions of certain parts have been exaggerated to better illustrate details and features of the present disclosure.

As used herein and in the appended claims, the following terms and phrases have the corresponding definitions set forth below.

The term "bridging agent" means a chemical or other component (e.g., a plurality of solid particles) that when present in a well treatment fluid can bridge across the pore throat or fractures of an exposed rock thereby building a filter cake to prevent or reduce loss of the well treatment fluid or a portion thereof to a subterranean formation.

The term "casing" refers to both liners and casings.

The term "chelating agent" means a chemical or other component that when present in a well treatment fluid can bind metal ions to prevent or reduce the precipitation of a metal (e.g., iron) from the well treatment fluid.

The term "defoamer" means a chemical or other component that when present in a well treatment fluid can lower interfacial tension so that trapped gas will more readily escape from the well treatment fluid.

The term "drilling fluid" (also known as "drilling mud") means a fluid used in connection with drilling a well in order to cool, lubricate, and support the drill bit, remove cuttings from the wellbore, control formation pressures, and maintain the stability of the wellbore. The terms "drilling fluid" and "drilling mud" are used interchangeably herein.

The term "fluid loss control agent" means a chemical or other component that when present in a well treatment fluid can prevent or reduce fluid communication between the wellbore and a subterranean formation. For example, a fluid loss control agent can prevent or reduce migration of fluids from a subterranean formation into the wellbore. For example, a fluid loss control agent can also prevent or reduce fluid leak-off and/or lost circulation.

A "fluid loss control fluid" means a well treatment fluid that functions to reduce or prevent fluid communication between the wellbore and a subterranean formation, fluid leak-off and/or lost circulation.

The term "polymer" means a chemical compound or mixture of compounds formed by polymerization and having repeating subunits (also referred to as monomers). Unless stated otherwise, the term "polymer" includes and encompasses homopolymers, copolymers, terpolymers and the like. The term "copolymer" means a chemical compound or mixture of compounds formed by polymerization and having two or more different types of subunits (also referred to as monomers) that are linked to form a polymer chain.

A "graft copolymer" means a copolymer that has a main chain that includes a polymer backbone, and one or more side chains of a homopolymer attached to the polymer backbone of the main chain.

A "biodegradable graft copolymer" means a graft copolymer that includes an organic compound that can be broken down by microorganisms. Use of the term "biodegradable graft copolymer" does not imply that the entire graft copolymer is biodegradable, a particular degree of biodegradability, or a specified biodegradation half-life.

A "water soluble polymer" means a polymer that dissolves or swells in an aqueous-based well treatment fluid and thus modifies one or more physical properties of the well treatment fluid.

A "spacer fluid" means a fluid that is circulated through a wellbore to displace a component (for example, drilling mud) from the wellbore, and to optionally carry out one or more other functions, prior to introduction of another well treatment fluid into the wellbore. For example, a spacer fluid can physically separate one well treatment fluid from another. As used herein, to "displace" a component means to partially or fully displace the component.

A "cement spacer fluid" means a fluid that is circulated through a wellbore to displace a component (for example, drilling mud) from the wellbore, and to optionally carry out one or more other functions, prior to introduction of a cement composition into the wellbore.

The term "set" means an increase in mechanical strength of a hydraulic cement composition sufficient to perform a desired result, such as to restrict movement of an item or impede fluid flow or pressure transfer through a fluid. In most instances, the cement composition may be referred to as set when it has cured to a fully solid composition.

The term "subterranean formation" means a formation below the surface of the Earth. A subterranean formation can be below the surface of dry land or below the bottom or floor of a body of water such as a lake or the ocean. As used herein, the "top" of a well means the well at the surface (e.g., at the wellhead which may be located on dry land or below water, e.g., a subsea wellhead). The direction along a wellbore towards the well surface is referred to as "up" (for example, a fluid circulated from the bottom of the well to the top of the well travels "upwardly"). The "bottom" of a well means the end of the wellbore away from the surface. The direction along a wellbore away from the wellbore surface is referred to as "down" (for example, a fluid circulated from the surface to the bottom of the well travels "downwardly"). For example, in a horizontal wellbore, although two locations may be at the same depth within a subterranean formation, the location closer to the well surface (by comparing the lengths along the wellbore from the wellbore surface to the locations) is referred to as "above" the other location.

The term "viscosifying agent" means a chemical or other component that when present in a well treatment fluid can increase the viscosity of the well treatment fluid.

A "well" means a wellbore that extends from the surface into the ground and penetrates a subterranean formation. For example, a well can be an oil well, a natural gas well, a water well, or any combination thereof.

A "wellbore" means a borehole having a cylindrical shape and a borehole wall.

A "method of treating a well" means an operation that is carried out in a well and uses a well treatment fluid to treat a wellbore, a subterranean formation penetrated by the wellbore, and/or equipment associated with the wellbore and/or subterranean formation (e.g., a casing). For example, as used herein, a "method of treating a well" can be a method of drilling a well, an operation involving a spacer fluid, a cementing operation, a method of cementing a well, or a method of completing a well.

A "well treatment fluid" means any fluid that is introduced into a well or subterranean formation penetrated thereby to treat the wellbore, subterranean formation, and/or equipment associated with the wellbore and/or subterranean formation (e.g., a casing). For example, a well treatment fluid can be a drilling fluid (for example, a drilling mud), a spacer fluid (for example, a cement spacer fluid), a cement composition, or a completion fluid.

Unless stated otherwise, admixing one component into another component means mixing or dissolving the one component with or in the second component.

Unless stated otherwise, a "mixture" means a mixture or a solution of two or more components.

Whenever a range is disclosed herein, the range includes independently and separately every member of the range extending between any two numbers enumerated within the range. Furthermore, the lowest and highest numbers of any range shall be understood to be included within the range set forth.

In accordance with the present disclosure, a method of treating a well and a well treatment fluid are provided. For example, in one embodiment, a method of treating a well disclosed herein is a method of cementing a casing in a well. For example, the well treatment fluid can be a cement spacer fluid.

An example of a method of treating a well disclosed herein comprises introducing a well treatment fluid into the well. The well treatment fluid includes an aqueous base fluid, a bridging agent, a viscosifying agent, and a water soluble, biodegradable graft copolymer.

The method can be used in a variety of applications. For example, the well treatment fluid can be selected from the group of a drilling fluid, a spacer fluid (for example, a cement spacer fluid), a cement composition, a completion fluid, and a separate fluid loss control fluid. For example, the well treatment fluid can be a drilling fluid. For example, the well treatment fluid can be a spacer fluid. For example, the well treatment fluid can be a cement spacer fluid.

For example, the aqueous base fluid of the well treatment fluid can be water. The water can come from a variety of sources. For example, the water can be fresh water. For example, the water can be salt-containing water. Examples of salt-containing water include saltwater, brine (for example, saturated saltwater or produced water), seawater, brackish water, produced water (for example, water produced from a subterranean formation), formation water, treated flowback water, and any combination thereof.

The water can be present in the well treatment fluid in an amount effective to provide a slurry having desired (e.g., job or service specific) rheological properties such as density, viscosity, gel strength, yield point, etc. For example, the water can be present in the well treatment fluid in an amount of from about 5 gallons per barrel (gal/bbl) to about 60 gal/bbl based on the total volume of the well treatment fluid. For example, the water can be present in the well treatment fluid in an amount of from about 10 gallons per barrel (gal/bbl) to about 55 gal/bbl based on the total volume of the well treatment fluid. For example, the water can be present in the well treatment fluid in an amount of from about 15 gallons per barrel (gal/bbl) to about 50 gal/bbl based on the total volume of the well treatment fluid.

For example, the bridging agent of the well treatment fluid can be selected from the group consisting of graphite, sand (e.g., 100 mesh), silica flour, mineral particles, thermoset polymer laminate particles, graphitic carbon-based particles, ground battery casings, ground tires, nut shells (e.g., ground nut shells such as walnut hulls, peanut shells, and almond shells), metal carbonates (e.g., calcium carbonate such as sized-calcium carbonate particles), petroleum coke particles, vitrified shale particles, calcium clay particles, glass particles, mica (including mica particles), ceramic particles, oil soluble resins, polymeric beads, fibers, including synthetic fibers (e.g., polypropylene fibers), glass fibers, and mineral fibers (e.g., basalt, wollastonite, and sepiolite), polylactic acid, polyvinyl alcohol, and combinations thereof. For example, the bridging agent can include particles having the physical shape of platelets, shavings, fibers, flakes, ribbons, rods, strips, spheroids, toroids, pellets, tablets, or any other physical shape. Commercial examples of suitable sized-calcium carbonate particles include but are not limited to BARACARB® 5 sized-calcium carbonate, BARACARB® 25 sized-calcium carbonate, BARACARB® 50 sized-calcium carbonate, and BARACARB® 150 sized-calcium carbonate, which are commercially available from Halliburton Energy Services, Inc.

For example, the bridging agent of the well treatment fluid can be selected from the group consisting of metal carbonates (e.g., calcium carbonate), oil soluble resins, nutshells (e.g., ground nutshells such as walnut hulls, peanut shells, and almond shells), mica, fibers, graphite, polylactic acid, polyvinyl alcohol, and combinations thereof. For example, the bridging agent is selected from the group consisting of calcium carbonate, walnut hulls, and combinations thereof.

For example, the bridging agent can be present in the well treatment fluid in an amount in the range of from about 5 grams per liter to about 140 grams per liter based on the total volume of the well treatment fluid. For example, the bridging agent can be present in the well treatment fluid in an amount in the range of from about 10 grams per liter to about 120 grams per liter based on the total volume of the well treatment fluid. For example, the bridging agent can be present in the well treatment fluid in an amount in the range of from about 15 grams per liter to about 100 grams per liter based on the total volume of the well treatment fluid. The amount of the bridging agent used in the well treatment fluid will vary depending on, for example, the anticipated amount of fluid loss to be experienced in connection with the well treatment fluid.

For example, the viscosifying agent of the well treatment fluid can be selected from the group consisting of one or more gums, one or more clays, and combinations thereof.

For example, the viscosifying agent can include one or more gums selected from the group consisting of diutan, xanthan, guar, welan gum, hydroxyl propyl guar, cellulose, hydroxypropyl cellulose phosphate, hydroxypropyl starch phosphate, and combinations thereof. For example, the viscosifying agent can include one or more gums selected from the group consisting of diutan, xanthan, guar, welan gum, and combinations thereof. For example, the viscosifying agent can include diutan gum. A diutan gum that is suitable for use as or as part of the primary viscosifier component of the well treatment fluid is available from CP Kelco in association with the trademark GEOVIS® XT.

For example, the viscosifying agent can include one or more clays selected from the group consisting of natural clays, synthetic clays, or combinations thereof. For example, the clay(s) can be selected from the group consisting of sepiolite, attapulgite, bentonite, hectorite, sodium bentonite, montmorillonite, beidellite, nontronite, hectorite, samonite, smectite, kaolinite, serpentine, illite, chlorite, montmorillonite, saponite, fuller's earth, and combinations thereof. For example, the clay(s) can be selected from the group consisting of sepiolite, attapulgite, bentonite, hectorite, and combinations thereof. For example, the viscosifying agent can include sepiolite clay.

For example, the viscosifying agent includes diutan and sepiolite clay.

For example, the viscosifying agent can be present in the well treatment fluid in an amount in the range of from about 0.1 grams per liter to about 3 grams per liter based on the total volume of the well treatment fluid. For example, the viscosifying agent can be present in the well treatment fluid in an amount in the range of from about 0.2 grams per liter to about 2.5 grams per liter based on the total volume of the well treatment fluid. For example, the viscosifying agent can be present in the well treatment fluid in an amount in the range of from about 0.3 grams per liter to about 2 grams per liter based on the total volume of the well treatment fluid. The amount of the viscosifying agent used in the well treatment fluid will vary depending on, for example, the density of the well treatment fluid.

The water soluble, biodegradable, graft copolymer of the well treatment fluid comprises:
  (a) a grafting base;
  (b) a first monomer component grafted onto the grafting base, the first monomer component being selected from the group consisting of acrylamido-2-methyl propane sulfonic acid, acrylic acid, acrylamide, vinyl acetic acid, methacrylic acid, dimethyl methacrylate, and combinations thereof; and (c) a second monomer component grafted onto the grafting base, the second monomer component being an organic compound.

As stated above, a "graft copolymer" means a copolymer that has a main chain that includes a polymer backbone, and one or more side chains of a homopolymer attached to the polymer backbone of the main chain. A "biodegradable graft copolymer" means a graft copolymer that includes an organic compound that can be broken down by microorganisms. A "water soluble polymer" means a polymer that dissolves or swells in an aqueous-based well treatment fluid and thus modifies one or more physical properties of the well treatment fluid.

For example, the grafting base of the graft copolymer of the well treatment fluid is the polymer backbone of the graft copolymer. For example, the grafting base is a linear polymer backbone. The first monomer component and the second monomer component are grafted on to the grafting base to form the graft copolymer.

For example, grafting base of the graft copolymer can be selected from the group consisting of lignin, tannin, and humic acid. For example, the grafting base can be lignin. For example, the grafting base can be water soluble.

For example, the first monomer component can be acrylamido-2-methyl propane sulfonic acid (AMPS).

For example, the second monomer component is an organic compound that can be broken down by microorganisms. Any suitable organic compound can be used. Thus, the second monomer component allows the graft copolymer to be a biodegradable graft copolymer as defined above. For example, the second monomer component can be selected from the group consisting of gelatin, collagen, casein, soy protein, and combinations thereof. For example, the second monomer component can be gelatin.

For example, the water soluble, biodegradable, graft copolymer comprises in the range of from about 5% by weight to about 25% by weight of the polymer backbone, in the range of from about 10% by weight to about 80% by weight of the first monomer component, and in the range of from about 10% by weight to about 70% by weight of the second monomer component, the weight percentages being based on the total weight of the graft copolymer. For example, the water soluble, biodegradable, graft copolymer comprises in the range of from about 5% by weight to about 20% by weight of the polymer backbone, in the range of from about 10% by weight to about 80% by weight of the first monomer component, and in the range of from about 10% by weight to about 70% by weight of the second monomer component, the weight percentages being based on the total weight of the graft copolymer.

For example, the water soluble, biodegradable graft copolymer can be present in the well treatment fluid in an amount in the range of from about 2 grams per liter to about 40 grams per liter, based on the total volume of the well treatment fluid. For example, the water soluble, biodegradable graft copolymer can be present in the well treatment fluid in an amount in the range of from about 5 grams per liter to about 30 grams per liter, based on the total volume of the well treatment fluid. For example, the water soluble, biodegradable graft copolymer can be present in the well treatment fluid in an amount in the range of from about 3 grams per liter to about 30 grams per liter, based on the total volume of the well treatment fluid. The amount of the water soluble, biodegradable graft copolymer used in the well treatment fluid will vary depending on, for example, the anticipated amount of fluid loss to be experienced in connection with the well treatment fluid.

For example, the well treatment fluid can further comprise a metal chelating agent. For example, the metal chelating agent can be selected from the group consisting of citric acid, tartaric acid, nitrile tri acetic acid, and combination thereof. For example, the metal chelating agent can be citric acid.

For example, the metal chelating agent can be present in the well treatment fluid in an amount in the range of from about 0.5 grams per liter to about 5 grams per liter based on the total volume of the well treatment fluid. For example, the metal chelating agent can be present in the well treatment fluid in an amount in the range of from about 1 gram per liter to about 4 grams per liter based on the total volume of the well treatment fluid. For example, the metal chelating agent can be present in the well treatment fluid in an amount in the range of from about 1.5 grams per liter to about 3 grams per liter based on the total volume of the well treatment fluid. The amount of the metal chelating used in the well treatment fluid will vary depending on, for example, the amount of metal (e.g., iron) in the well treatment fluid.

For example, the well treatment fluid can further comprise a dispersant. For example, the dispersant can be selected from the group consisting of sodium acid pyrophosphate (SAPP), ammonium lignosulfonate salt, metal lignosulfonate salts, phosphates, polyphosphates, organophosphates, phosphonates, tannins, leonardite, sulfonated naphthalene formaldehyde condensate, sulfonated acetone formaldehyde condensate, polyacrylates having a molecular weight less than about 10,000, and combinations thereof. An example of a suitable dispersant is CFR-3™ cement friction reducer, which is commercially available from Halliburton Energy Services, Inc.

For example, the dispersant can be present in the well treatment fluid in an amount in the range of from about 1 gram per liter to about 20 grams per liter, based on the total volume of the well treatment fluid. For example, the dispersant can be present in the well treatment fluid in an amount in the range of from about 2 gram per liter to about 18 grams per liter, based on the total volume of the well treatment fluid. For example, the dispersant can be present in the well treatment fluid in an amount in the range of from about 3 gram per liter to about 15 grams per liter, based on the total volume of the well treatment fluid.

For example, the well treatment fluid can further comprise a weighting agent. For example, the weighting agent can be selected from the group consisting of barium sulfate (e.g., barite), iron oxide (e.g., hematite), manganese oxide (e.g., hausmannite), sand (e.g., silica sand), ilmenite, manganese tetraoxide, zinc oxide, zirconium oxide, fly ash, calcium carbonate, siderite, and combinations thereof. Barite is a nonmetallic mineral of barium sulfate ($BaSO_4$) with a specific gravity range of from about 4.3 to about 5. Examples of suitable barites include BAROID® 41 weighting material and SWEEP-WATE® Coarse Grind Barite weighting material, which are commercially available from Halliburton Energy Services, Inc. For example, the weighting agent can be a light weight additive selected from the group of glass beads, foam (for example, nitrogen foam or air foam), and combinations thereof.

For example, the weighting agent can be present in the well treatment fluid in an amount in the range of from about 0.1 gram per liter to about 2400 grams per liter, based on the total volume of the well treatment fluid. For example, the weighting agent can be present in the well treatment fluid in an amount in the range of from about 0.1 gram per liter to about 2200 grams per liter, based on the total volume of the well treatment fluid. For example, the weighting agent can be present in the well treatment fluid in an amount in the range of from about 0.1 gram per liter to about 2000 grams per liter, based on the total volume of the well treatment fluid.

As will be understood by those skilled in the art with the benefit of this disclosure, depending on the application of the method and well treatment fluid disclosed herein, the characteristics of and conditions associated with the well and other factors, the well treatment fluid disclosed herein can further comprise one or more additional components. As used herein and in the appended claims, an "additional component" of the well treatment fluid means a component in addition to the aqueous base fluid, bridging agent, viscosifying agent, and water soluble, biodegradable graft copolymer of the well treatment fluid described above.

For example, the well treatment fluid can further comprise one or more additional components selected from the group of lost circulation materials, non-emulsifiers, emulsifiers, expansion agents, salts, suspending agents, gelling agents, gel cross-linkers, defoamers, fluid loss control additives, friction reducing agents, clay control agents, a vitrified shale, thixotropic agents, dispersing agents, weight reducing additives (e.g., hollow glass or ceramic beads), heavyweight additives, surfactants, buffers and other pH adjusting agents, clay stabilizers, silicate-control agents, biocides, bactericides, biostatic agents, storage stabilizers, filtration control additives, suspending agents, foaming surfactants, latex emulsions, formation conditioning agents, elastomers, gas/fluid adsorbing materials, resins, super absorbers, mechanical property modifying agents (e.g., carbon fibers, glass fibers, metal fibers, minerals fibers, polymeric elastomers, latexes, etc.), inert particulates, scale inhibitors, lubricants, corrosion inhibitors, other surfactants, proppant particulates (including conventional or primary proppant particulates and micro-proppant particulates), and gravel. As will be understood by those skilled in the art with the benefit of this disclosure, the additional components and the amounts thereof that are utilized will vary depending on the particular application in which the well treatment fluid is used.

An example of a non-emulsifier that can be used is polyethylene glycol alkyl ether, sulfate ammonium salt, for example, wherein the alkyl ether has from 6 to 10 carbon atoms. For example, a suitable non-emulsifier is sold by Halliburton Energy Services, Inc. in association with the trademark SEM-8™.

Examples of friction reducing agents that can be used include polysaccharides, polyacrylamides and combinations thereof.

Examples of clay control agents that can be included in the well treatment fluid include salts such as potassium chloride, sodium chloride, ammonium chloride, choline chloride, di-quaternary polymers and poly quaternary polymers.

Examples of buffers and other pH adjusting agents that can be included in the well treatment fluid include sodium hydroxide, potassium hydroxide, sodium carbonate, sodium bicarbonate, potassium carbonate, potassium bicarbonate, acetic acid, sodium acetate, sulfamic acid, hydrochloric acid, formic acid, citric acid, phosphonic acid, polymeric acids and combinations thereof. For example, the pH of the well treatment fluid can be adjusted to activate or deactivate a crosslinking agent or to activate a breaker.

Examples of biocides and bactericides that can be included in the well treatment fluid disclosed herein include 2,2-dibromo-3-nitrilopropionamide, 2-bromo-2-nitro-1,3-propanediol, sodium hypochlorite, and combinations thereof. For example, biocides and bactericides may be included in the fracturing fluid in an amount in the range of from about 0.001% to about 0.1% by weight, based on the weight of the aqueous base fluid.

Examples of scale inhibitors that can be included in the well treatment fluid disclosed herein include bis(hexamethylene triamine penta(methylene phosphonic acid)), diethylene triamine penta(methylene phosphonic acid), ethylene diamine tetra(methylene phosphonic acid), hexamethylenediamine tetra(methylene phosphonic acid), 1-hydroxyethylidene-1,1-diphosphonic acid, 2-hydroxyphosphonocarboxylic acid, 2-phosphonobutane-1,2,4-tricarboxylic acid, phosphino carboxylic acid, diglycol amine phosphonate, aminotris(methanephosphonic acid), methylene phosphonate, phosphonic acid, aminoalkylene phosphonic acid, aminoalkyl phosphonic acid, polyphosphate, salts of polyphosphate, and combinations thereof.

Examples of lubricants that can be included in the well treatment fluid disclosed herein include surfactants, vegetable oils, mineral oils, synthetic oils, silicone oils and polymers.

Examples of corrosion inhibitors that can be included in the well treatment fluid disclosed herein include quaternary ammonium compounds, unsaturated carbonyl compounds, and unsaturated ether compounds.

Examples of non-emulsifiers that can be included in the well treatment fluid disclosed herein include cationic, non-ionic, anionic, and zwitterionic non-emulsifiers. Specific examples of non-emulsifiers that can be used include a combination of terpene and an ethoxylated alcohol, ethoxylated nonyl phenols, octyl phenol polyethoxyethanol, potassium myristate, potassium stearylsulfate, sodium lauryl sulfonate, polyoxyethylene alkyl phenol, polyoxyethylene, polyoxyethylene (20 mole) stearyl ether, N-cetyl-N-ethyl morpholinium ethosulfate, and combinations thereof.

In accordance with the method disclosed herein, the well treatment fluid can be introduced into the well, for example, by pumping the well treatment fluid into the well using one or more pumps present on the well site as known to those skilled in the art with the benefit of this disclosure. The components of the well treatment fluid can be mixed together using mixing equipment in any manner known to those skilled in the art with the benefit of this disclosure. For example, components can be mixed together using mixing equipment present on the well site. For example, components can be added to the well treatment fluid on the fly as the well treatment fluid is pumped into the wellbore.

The method disclosed herein can further include the step of removing the well treatment fluid from the well. For example, the well treatment fluid can be displaced from the wellbore by circulating another fluid through the wellbore and forcing the well treatment fluid to the surface and out of the wellbore where it can be collected and/or disposed. The well treatment fluid can also be pumped out of the wellbore using pumping equipment.

In an example of the method disclosed herein, the well treatment fluid is a spacer fluid, and the method further comprises:
  a) prior to introducing the well treatment fluid into the well, introducing a first fluid into the well, the first fluid being different in composition than the well treatment fluid;
  b) prior to introducing the well treatment fluid into the well, placing a cylindrical conduit into the wellbore, wherein the conduit has an outside diameter that is less than the diameter of the wellbore such that an annulus is formed between the exterior of the conduit and the wall of the wellbore;
c) in connection with introducing the well treatment fluid into the wellbore, circulating the well treatment fluid through the conduit and the annulus to displace the first fluid therefrom; and
d) after introducing the well treatment fluid into the well, introducing a second fluid into the well, the second fluid being different in composition than the first fluid and the well treatment fluid.

As used herein an in the appended claims, stating that first fluid is different in composition than the well treatment fluid means that the first fluid has different components than the well treatment fluid. Similarly, stating that the second fluid is different in composition than the first fluid and the well treatment fluid means that the second fluid has different components than both the first fluid and the well treatment fluid. For example, the first fluid can be a drilling fluid, the second fluid can be a hydraulic cement composition, and the well treatment fluid can be a cement spacer fluid. For example, the conduit can be a casing and the cement composition can be a primary cement composition.

For example, the well treatment fluid can be circulated downwardly through the interior of the conduit, out an end (e.g., the lower end) of the conduit and upwardly through the annulus to the surface. Alternatively, the well treatment fluid can be circulated downwardly through annulus, out an end (e.g., the lower end) of the annulus and upwardly through the interior of the conduit to the surface. For example, once at the surface, the well treatment fluid can be collected, further processed and/or disposed.

In an example of a method of cementing a casing in a well disclosed herein, the well treatment fluid is a cement spacer fluid, and the method comprises:
a) placing an cylindrical casing into the wellbore, wherein the casing has an outside diameter that is less than the diameter of the wellbore such that an annulus is formed between the exterior of the casing and the wall of the wellbore; and
b) after placing the casing into the wellbore, circulating a cement spacer fluid downwardly through the interior of the casing, out an end of the casing, and upwardly through the annulus to the surface;
c) after circulating the cement spacer fluid downwardly through the interior of the casing, out an end of the casing, and upwardly through the annulus to the surface, circulating a hydraulic cement composition downwardly through the interior of the casing, out an end of the casing, and upwardly into the annulus; and
d) allowing the hydraulic cement composition to set in the annulus thereby forming an annular sheath of hardened cement therein.

Again, the cement spacer fluid is the well treatment fluid described above. For example, the well treatment fluid can be circulated downwardly through the interior of the conduit, out an end (e.g., the lower end) of the conduit and upwardly through the annulus to the surface. Alternatively, the well treatment fluid can be circulated downwardly through annulus, out an end (e.g., the lower end) of the annulus and upwardly through the interior of the conduit to the surface. For example, once at the surface, the well treatment fluid can be collected and further processed, or disposed.

Prior to carrying out the method of cementing a casing in a well, the well is drilled, and a drilling fluid (e.g., drilling mud) can be circulated through the wellbore.

For example, the aqueous-based cement spacer fluid separates the drilling fluid and/or any other fluids that may remain in the casing and annulus from the cement composition and helps to prepare the casing and formation for the primary cementing operation. For example, the spacer fluid functions to displace and clean out drilling mud and other materials in the casing and the annulus prior to injection of the hydraulic cement composition into the well. The spacer fluid also helps to condition the casing and annulus to form a good bond with the cement.

For example, the water soluble, biodegradable, graft copolymer of the cement spacer fluid acts as a fluid loss control agent to reduce or prevent migration of fluids into the wellbore, fluid leak-off and/or lost circulation, both with respect to the cement spacer fluid itself as well as the subsequently injected cement composition. The bridging agent and viscosifying agent also help to control migration of fluids into the wellbore, fluid leak-off, and/or lost circulation. As a result, use of the well treatment fluid helps lower non-productive time (NPT) and control other problems associated with migration of fluids into the wellbore, fluid leak-off, and/or lost circulation.

The hydraulic cement of the hydraulic cement composition used in the method can include calcium, aluminum, silicon, oxygen, and/or sulfur that sets and hardens by reaction with the water. As used herein, the term "cement composition" encompasses pastes (or slumes), mortars, grouts (e.g., oil well cementing grouts), shotcrete, and concrete compositions including a hydraulic cement binder. The cement composition described herein may be formed by mixing required amounts of certain materials (e.g., a hydraulic cement, water, and fine and/or coarse aggregate) as may be required for making a particular cementitious composition.

Examples of hydraulic cements may include, but are not limited to, Portland cements (e.g., Classes A, C, G, and H Portland cements), pozzolana cements, gypsum cements, phosphate cements, high alumina content cements, silica cements, high alkalinity cements, and combinations thereof. Cements including shale, cement kiln dust, or blast furnace slag also may be suitable for use in some embodiments described herein. In certain embodiments, the shale may include vitrified shale. In certain other embodiments, the shale may include raw shale (e.g., unfired shale), or a mixture of raw shale and vitrified shale.

For example, the hydraulic cement of the hydraulic cement composition can be selected from the group of Portland cements, slag cements, pozzolana cements, gypsum cements, aluminous cements and silica cements. For example, the hydraulic cement of the hydraulic cement composition can be Portland cement. For example, the hydraulic cement of the hydraulic cement composition can be Class G Portland Cement.

As understood by those skilled in the art with the benefit of this disclosure, additional components can also be included in the hydraulic cement composition disclosed herein, for example, additional blend materials, filler materials, dispersants, oxidizing agents, solvents, strength stabilizing agents, fluid loss control additives, suspending aids, free-water control agents, retarders, accelerators, expansion additives, viscosifiers, gas migration additives and mechanical property enhancers.

The cement sheath physically supports and positions the casing in the wellbore and bonds the exterior surface of the casing to the wall of the wellbore, whereby undesirable migration of fluids between zones or formations penetrated by the wellbore is prevented.

The well treatment fluid disclosed herein is the well treatment fluid used in the method disclosed and described herein.

For example, the well treatment fluid disclosed herein can be compatible with drilling fluids and cement compositions. It can be suitable for use in connection with most downhole temperature and other conditions, and has good rheological properties. For example, the well treatment fluid can be used at a temperature in the range of room temperature to about 450° F. For example, the well treatment fluid can have a density in the range of from about 8.5 lb/gal to about 20 lb/gal.

For example, the well treatment fluid disclosed herein can effectively prevent or control migration of fluids into the wellbore, fluid leak-off, and/or lost circulation, both respect to the well treatment fluid and a fluid subsequently introduced into the wellbore. Due to the fact that the graft copolymer is biodegradable, the well treatment fluid disclosed herein is more suitable than other well treatment fluids for use in connection with wells in environmentally sensitive areas.

For example, in one embodiment, a method of treating a well disclosed herein comprises:
 introducing a well treatment fluid into the well, the well treatment fluid including:
  water;
  a bridging agent selected from the group consisting of metal carbonates, suspended salts, oil soluble resins, nutshells, mica, fibers, graphite, polylactic acid, polyvinyl alcohol, and combinations thereof;
  a viscosifying agent selected from the group consisting of one or more gums, one or more clays, and combinations thereof; and
  a water soluble, biodegradable, graft copolymer, the graft copolymer comprising:
   a grafting base;
   a first monomer component grafted onto the grafting base, the first monomer component being selected from the group consisting of acrylamido-2-methyl propane sulfonic acid, acrylic acid, acrylamide, vinyl acetic acid, methacrylic acid, dimethyl methacrylate, and combinations thereof; and
   a second monomer component grafted onto the grafting base, the second monomer component being an organic compound.

For example, in one embodiment, a method of treating a well disclosed herein comprises:
 introducing a well treatment fluid into the well, the well treatment fluid including:
  water;
  a bridging agent selected from the group consisting of metal carbonates, suspended salts, oil soluble resins, nutshells, mica, fibers, graphite, polylactic acid, polyvinyl alcohol, and combinations thereof;
  a viscosifying agent selected from the group consisting of one or more gums, one or more clays, and combinations thereof; and
  a water soluble, biodegradable, graft copolymer, the graft copolymer comprising:
   a grafting base selected from the group consisting of lignin, tannin, and humic acid;
   a first monomer component grafted onto the grafting base, the first monomer component being selected from the group consisting of acrylamido-2-methyl propane sulfonic acid, acrylic acid, acrylamide, vinyl acetic acid, methacrylic acid, dimethyl methacrylate, and combinations thereof; and
   a second monomer component grafted onto the grafting base, the second monomer component being an organic compound selected from the group consisting of gelatin, collagen, casein, soy protein, and combinations thereof.

For example, in another embodiment, a method of treating a well disclosed herein comprises:
 introducing a well treatment fluid into the well, the well treatment fluid including:
  an aqueous base fluid;
  a bridging agent;
  a viscosifying agent; and
  a water soluble, biodegradable, graft copolymer, the graft copolymer comprising:
   a grafting base selected from the group consisting of lignin, tannin, and humic acid;
   a first monomer component grafted onto the grafting base, the first monomer component being acrylamido-2-methyl propane sulfonic acid; and
   a second monomer component grafted onto the grafting base, the second monomer component being an organic compound selected from the group consisting of gelatin, collagen, casein, soy protein, and combinations thereof.

For example, in another embodiment, the method of treating a well disclosed herein comprises:
 introducing a well treatment fluid into the well, the well treatment fluid including:
  water;
  a bridging agent selected from the group consisting of metal carbonates, suspended salts, oil soluble resins, nutshells, mica, fibers, graphite, polylactic acid, polyvinyl alcohol, and combinations thereof;
  a viscosifying agent selected from the group consisting of one or more gums, one or more clays, and combinations thereof; and
  a water soluble, biodegradable, graft copolymer, the graft copolymer comprising:
   a grafting base selected from the group consisting of lignin, tannin, and humic acid,
   a first monomer component grafted onto the grafting base, the first monomer component being selected from the group consisting of acrylamido-2-methyl propane sulfonic acid, acrylic acid, acrylamide, vinyl acetic acid, methacrylic acid, dimethyl methacrylate, and combinations thereof; and
   a second monomer component grafted onto the grafting base, the second monomer component being gelatin.

For example, in one embodiment, the well treatment fluid disclosed herein comprises:
 water;
 a bridging agent selected from the group consisting of metal carbonates, suspended salts, oil soluble resins, nutshells, mica, fibers, graphite, polylactic acid, polyvinyl alcohol, and combinations thereof;
 a viscosifying agent selected from the group consisting of one or more gums, one or more clays, and combinations thereof; and
 a water soluble, biodegradable, graft copolymer, the graft copolymer comprising:
  a grafting base;
  a first monomer component grafted onto the grafting base, the first monomer component being acrylamido-2-methyl propane sulfonic acid; and
  a second monomer component grafted onto the grafting base, the second monomer component being gelatin.

For example, in another embodiment, the well treatment fluid disclosed herein comprises:
an aqueous base fluid;
a bridging agent;
a viscosifying agent; and
a water soluble, biodegradable, graft copolymer, the graft copolymer comprising:
a grafting base, said grafting base being lignin;
a first monomer component grafted onto the grafting base, the first monomer component being acrylamido-2-methyl propane sulfonic acid, acrylic acid, acrylamide, vinyl acetic acid, methacrylic acid, dimethyl methacrylate, and combinations thereof; and
a second monomer component grafted onto the grafting base, the second monomer component being an organic compound selected from the group consisting of gelatin, collagen, casein, soy protein, and combinations thereof.

For example, in another embodiment, the well treatment fluid disclosed herein comprises:
water;
a bridging agent selected from the group consisting of metal carbonates, suspended salts, oil soluble resins, nutshells, mica, fibers, graphite, polylactic acid, polyvinyl alcohol, and combinations thereof;
a viscosifying agent selected from the group consisting of one or more gums, one or more clays, and combinations thereof; and
a water soluble, biodegradable, graft copolymer, the graft copolymer comprising:
a grafting base, said grafting base being lignin;
a first monomer component grafted onto the grafting base, the first monomer component being acrylamido-2-methyl propane sulfonic acid; and
a second monomer component grafted onto the grafting base, the second monomer component being gelatin.

For example, in another embodiment, the well treatment fluid disclosed herein comprises:
water;
a bridging agent selected from the group consisting of calcium carbonate, walnut hulls, and combinations thereof;
a viscosifying agent selected from the group consisting of a) one or more gums, selected from the group consisting of diutan, xanthan, guar, welan gum, hydroxyl propyl guar, cellulose, hydroxypropyl cellulose phosphate, hydroxypropyl starch phosphate, and combinations thereof; b) one or more clays, and c) combinations thereof; and
a water soluble, biodegradable, graft copolymer, the graft copolymer comprising:
a grafting base selected from the group consisting of lignin, tannin, and humic acid;
a first monomer component grafted onto the grafting base, the first monomer component being selected from the group consisting of acrylamido-2-methyl propane sulfonic acid, acrylic acid, acrylamide, vinyl acetic acid, methacrylic acid, dimethyl methacrylate, and combinations thereof; and
a second monomer component grafted onto the grafting base, the second monomer component being an organic compound selected from the group consisting of gelatin, collagen, casein, soy protein, and combinations thereof.

For example, in another embodiment, the well treatment fluid disclosed herein comprises:
water;
a bridging agent selected from the group consisting of calcium carbonate, walnut hulls, and combinations thereof;
diutan;
sepiolite; clay; and
a water soluble, biodegradable, graft copolymer, the graft copolymer comprising:
a grafting base selected from the group consisting of lignin, tannin, and humic acid;
a first monomer component grafted onto the grafting base, the first monomer component being acrylamido-2-methyl propane sulfonic acid; and
a second monomer component grafted onto the grafting base, the second monomer component being gelatin.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments described herein. At the very least, and not as an attempt to limit the application of the doctrine of equivalents to the scope of the claim, each numerical parameter should at least be construed in light of the number of reported significant digits and by applying ordinary rounding techniques. It should be noted that when "about" is at the beginning of a numerical list, "about" modifies each number of the numerical list. Further, in some numerical listings of ranges, some lower limits listed may be greater than some upper limits listed. One skilled in the art will recognize that the selected subset will require the selection of an upper limit in excess of the selected lower limit.

The exemplary fluids and compositions disclosed herein may directly or indirectly affect one or more components or pieces of equipment associated with the preparation, delivery, recapture, recycling, reuse, and/or disposal of the disclosed fluids and compositions. For example, the disclosed fluids and compositions may directly or indirectly affect one or more mixers, related mixing equipment, mud pits, storage facilities or units, composition separators, heat exchangers, sensors, gauges, pumps, compressors, and the like used to generate, store, monitor, regulate, and/or recondition the exemplary fluids and compositions. The disclosed fluids and compositions may also directly or indirectly affect any transport or delivery equipment used to convey the fluids and compositions to a well site or downhole such as, for example, any transport vessels, conduits, pipelines, trucks, tubulars, and/or pipes used to compositionally move the fluids and compositions from one location to another, any pumps, compressors, or motors (e.g., topside or downhole) used to drive the fluids and compositions into motion, any valves or related joints used to regulate the pressure or flow rate of the fluids and compositions, and any sensors (i.e., pressure and temperature), gauges, and/or combinations thereof, and the like. The disclosed fluids and compositions may also directly or indirectly affect the various downhole equipment and tools that may come into contact with the fluids and compositions such as, but not limited to, wellbore casing, wellbore liner, completion string, insert strings, drill string, coiled tubing, slickline, wireline, drill pipe, drill collars, mud motors, downhole motors and/or pumps, cement pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like.

Referring now to FIG. 1, a system that may be used in the preparation of a cement composition in accordance with example embodiments will now be described. FIG. 1 illustrates a system 2 for preparation of a cement composition and delivery to a wellbore in accordance with certain embodiments. As shown, the cement composition may be mixed in mixing equipment 4, such as a jet mixer, recirculating mixer, or a batch mixer, for example, and then pumped via pumping equipment 6 to the wellbore. In some embodiments, the mixing equipment 4 and the pumping equipment 6 may be disposed on one or more cement trucks as will be apparent to those of ordinary skill in the art. In some embodiments, a jet mixer may be used, for example, to continuously mix the composition, including water, as it is being pumped to the wellbore.

Figure 2A:
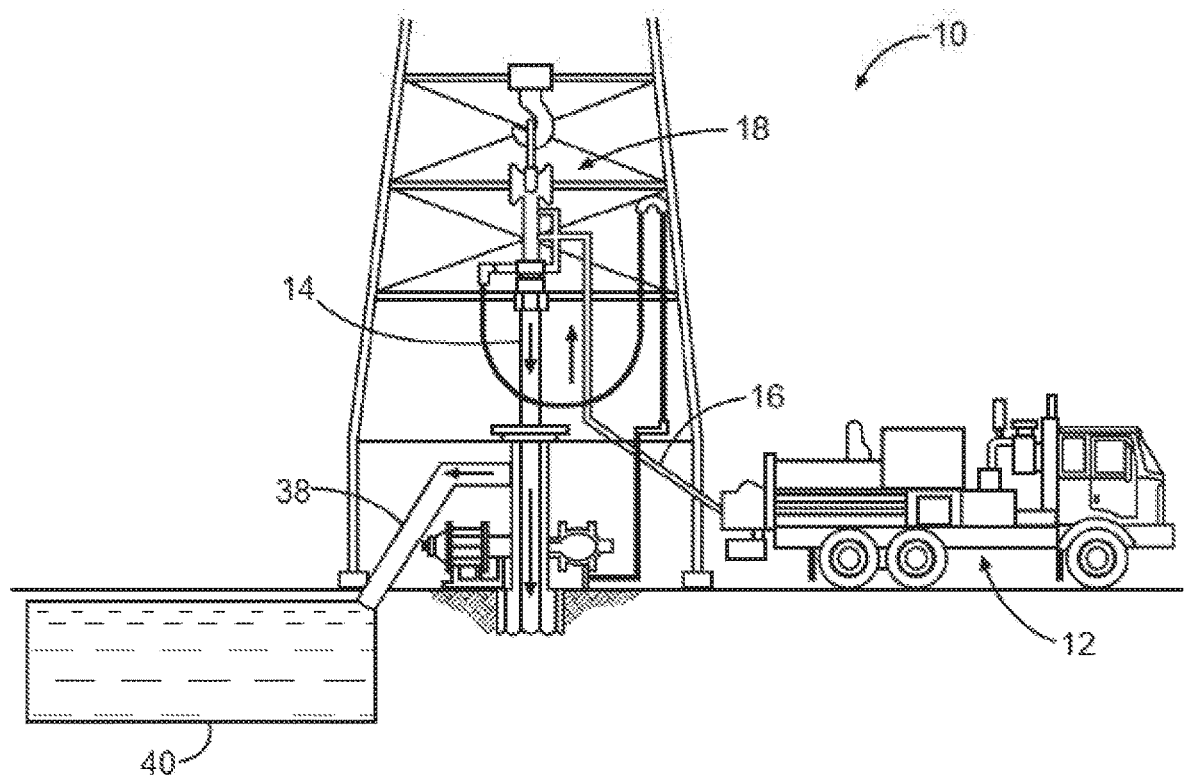
FIG. 2A illustrates surface equipment that may be used in the placement of a cement composition in a wellbore in accordance with aspects of the present disclosure.

An example technique and system for placing a cement composition into a subterranean formation will now be described with reference to FIGS. 2A and 2B. FIG. 2A illustrates surface equipment 10 that may be used in placement of a cement composition in accordance with certain embodiments. It should be noted that while FIG. 2A generally depicts a land-based operation, those skilled in the art will readily recognize that the principles described herein are equally applicable to subsea operations that employ floating or sea-based platforms and rigs, without departing from the scope of the disclosure. As illustrated by FIG. 2A, the surface equipment 10 may include a cementing unit 12, which may include one or more cement trucks. The cementing unit 12 may include mixing equipment 4 and pumping equipment 6 (e.g., FIG. 1) as will be apparent to those of ordinary skill in the art. The cementing unit 12 may pump a cement composition 14 through a feed pipe 16 and to a cementing head 18 which conveys the cement composition 14 downhole.

Figure 2B:
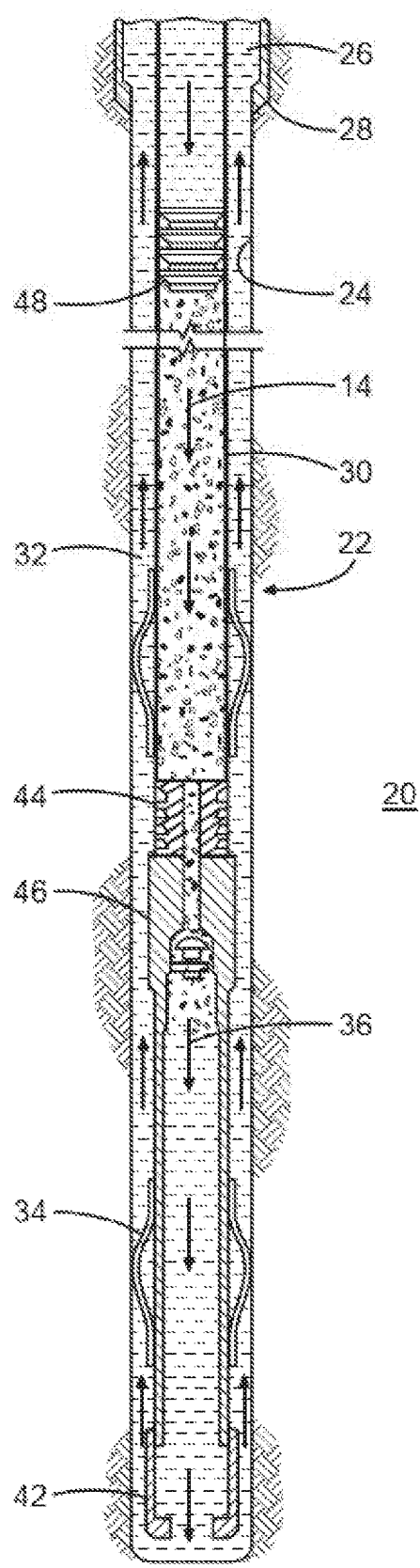
FIG. 2B illustrates placement of a cement composition into a wellbore annulus in accordance with aspects of the present disclosure.

Turning now to FIG. 2B, the cement composition 14 may be placed into a subterranean formation 20 in accordance with example embodiments. As illustrated, a wellbore 22 may be drilled into the subterranean formation 20. While wellbore 22 is shown extending generally vertically into the subterranean formation 20, the principles described herein are also applicable to wellbores that extend at an angle through the subterranean formation 20, such as horizontal and slanted wellbores. As illustrated, the wellbore 22 comprises walls 24. In the illustrated embodiments, a surface casing 26 has been inserted into the wellbore 22. The surface casing 26 may be cemented to the walls 24 of the wellbore 22 by cement sheath 28. In the illustrated embodiment, one or more additional conduits (e.g., intermediate casing, production casing, liners, etc.) shown here as casing 30 may also be disposed in the wellbore 22. As illustrated, there is a wellbore annulus 32 formed between the casing 30 and the walls 24 of the wellbore 22 and/or the surface casing 26. One or more centralizers 34 may be attached to the casing 30, for example, to centralize the casing 30 in the wellbore 22 prior to and during the cementing operation.

With continued reference to FIG. 2B, the cement composition 14 may be pumped down the interior of the casing 30. The cement composition 14 may be allowed to flow down the interior of the casing 30 through the casing shoe 42 at the bottom of the casing 30 and up around the casing 30 into the wellbore annulus 32. The cement composition 14 may be allowed to set in the wellbore annulus 32, for example, to form a cement sheath that supports and positions the casing 30 in the wellbore 22. While not illustrated, other techniques may also be utilized for introduction of the cement composition 14. By way of example, reverse circulation techniques may be used that include introducing the cement composition 14 into the subterranean formation 20 by way of the wellbore annulus 32 instead of through the casing 30.

As it is introduced, the cement composition 14 may displace other fluids (such as drilling fluids and/or spacer fluids) 36 that may be present in the interior of the casing 30 and/or the wellbore annulus 32. At least a portion of the displaced fluids 36 may exit the wellbore annulus 32 via a flow line 38 and be deposited, for example, in one or more retention pits 40 (e.g., a mud pit), as shown on FIG. 2A. Referring again to FIG. 2B, a bottom plug 44 may be introduced into the wellbore 22 ahead of the cement composition 14, for example, to separate the cement composition 14 from the fluids 36 that may be inside the casing 30 prior to cementing. After the bottom plug 44 reaches the landing collar 46, a diaphragm or other suitable device ruptures to allow the cement composition 14 through the bottom plug 44. In FIG. 2B, the bottom plug 44 is shown on the landing collar 46. In the illustrated embodiment, a top plug 48 may be introduced into the wellbore 22 behind the cement composition 14. The top plug 48 may separate the cement composition 14 from a displacement fluid 50 and also push the cement composition 14 through the bottom plug 44.

EXAMPLE

The following example illustrates specific embodiments consistent with the present disclosure but does not limit the scope of the disclosure or the appended claims. For example, although the example refers to the well treatment fluid as a "spacer fluid," it should be understood that the subject well treatment fluid may be used in other well treatment applications, for example, as a drilling fluid, or a separate fluid loss control fluid. Concentrations and percentages are by weight unless otherwise indicated.

A 13 lb/gal spacer fluid, with and without a water soluble, biodegradable graft copolymer as disclosed herein, was mixed and tested for rheology and fluid loss using a 60 mesh screen and 500 micron slot according to the general procedures set forth in API-RP-10B-2. Although the procedures and equipment set forth in API-RP-10B-2 were used, the specified mesh size and fluid loss calculation were slightly modified. For example, although the procedure in API-RP-10B-2 specifies a 325 mesh screen, a 60 mesh screen was used in these tests. Further, in these tests, the volume (mL) collected was the actual volume (mL) collected in 30 minutes.

The spacer fluid formulation is given in Table 1 whereas the results are depicted in Table 2 and 3 below:

TABLE 1

13 lb/gal Spacer Formulation for 350 ml fluid

|  | Spacer 1 | Spacer 2 |
|---|---|---|
| Graft copolymer (gm) | 12.7 | — |
| Diutan (gm) | 0.4 | 0.4 |
| Sepiolite (gm) | 9.1 | 9.1 |
| Citric acid (gm) | 0.3 | 0.3 |
| $CaCO_3$ (gm) | 12.4 | 12.4 |
| Walnut (gm) | 12.4 | 12.4 |
| Barite (gm) | 236.7 | 236.7 |
| De-foamer | 0.8 | 0.8 |
| Water (gm) | 264.7 | 276.2 |

TABLE 2

Rheology

| | Spacer 1 | | Spacer 2 | |
|---|---|---|---|---|
| RPM | 80° F. | 180° F. | 80° F. | 180° F. |
| 3 | 10 | 13 | 10 | 14 |
| 6 | 12 | 16 | 13 | 17 |
| 30 | 21 | 26 | 21 | 26 |
| 60 | 28 | 33 | 26 | 32 |
| 100 | 34 | 39 | 33 | 38 |
| 200 | 47 | 51 | 44 | 50 |
| 300 | 58 | 58 | 52 | 57 |
| PV (cP) | 46 | 43 | 41 | 42 |
| YP (lbf/100 ft2) | 15 | 20 | 16 | 20 |

TABLE 3

Fluid Loss

| Fluid Loss | Spacer 1 | Spacer 2 |
|---|---|---|
| 60 mesh screen @ 180° F./1000 psi (ml/30 min) | 61 | 109 |
| 500 micron slot @ 180° F./1000 psi (ml/30 min) | 4 | 15 |

As shown by the results, the spacer fluid that included the water soluble, biodegradable graft copolymer experienced substantially less fluid loss and yet had about the same rheological properties as a similar spacer fluid without the water soluble, biodegradable graft copolymer.

Therefore, the present treatment additives and methods are well adapted to attain the ends and advantages mentioned, as well as those that are inherent therein. The particular examples disclosed above are illustrative only, as the present treatment additives and methods may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative examples disclosed above may be altered or modified, and all such variations are considered within the scope and spirit of the present treatment additives and methods. While compositions and methods are described in terms of "comprising," "containing," "having," or "including" various components or steps, the compositions and methods can also, in some examples, "consist essentially of" or "consist of" the various components and steps. Whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee.

What is claimed is:

1. A method of treating a well, comprising:
   introducing a well treatment fluid into the well, said well treatment fluid including:
   an aqueous base fluid;
   a bridging agent wherein said bridging agent is a nutshell;
   a viscosifying agent selected from the group consisting of one or more gums, one or more clays, and combinations thereof; and
   a water soluble, biodegradable, graft copolymer, said graft copolymer comprising:
   a grafting base selected from the group consisting of lignin, tannin, and humic acid;
   a first monomer component grafted onto said grafting base, said first monomer component being selected from the group consisting of acrylamido-2-methyl propane sulfonic acid, acrylic acid, acrylamide, vinyl acetic acid, methacrylic acid, dimethyl methacrylate, and combinations thereof; and
   a second monomer component grafted onto said grafting base, said second monomer component being an organic compound selected from the group consisting of gelatin, collagen, casein, soy protein, and combinations thereof;
   wherein the combination of aqueous base fluid, bridging agent, viscosifying agent, and graft copolymer is effective as a fluid loss control fluid within the well.

2. The method of claim 1, wherein said aqueous base fluid is water.

3. The method of claim 1, wherein said bridging agent is selected from the group consisting of graphite, sand, silica flour, mineral particles, thermoset polymer laminate particles, graphitic carbon-based particles, ground battery casings, ground tires, nutshells, metal carbonates, petroleum coke particles, vitrified shale particles, calcium clay particles, glass particles, mica, ceramic particles, oil soluble resins, polymeric beads, fibers selected from the group consisting of synthetic fibers, glass fibers, and mineral fibers, polylactic acid, polyvinyl alcohol, and combinations thereof.

4. The method of claim 3, wherein said bridging agent is a nutshell selected from the group consisting of walnut hulls, peanut shells, almond shells, and combinations thereof.

5. The method of claim 4, wherein said bridging agent is walnut hulls.

6. The method of claim 1, wherein said gums are selected from the group consisting of diutan, xanthan, guar, welan gum, hydroxyl propyl guar, cellulose, hydroxypropyl cellulose phosphate, hydroxypropyl starch phosphate, and combinations thereof, and said clays are selected from the group consisting of natural clays, synthetic clays, and combinations thereof.

7. The method of claim 6, wherein said viscosifying agent includes diutan and sepiolite clay.

8. The method of claim 1, wherein said grafting base of said graft copolymer is lignin.

9. The method of claim 1, wherein said first monomer component of said graft copolymer is acrylamido-2-methyl propane sulfonic acid.

10. The method of claim 1, wherein said second monomer component of said graft copolymer is gelatin.

11. The method of claim 10, wherein said second monomer component is gelatin.

12. The method of claim 1, wherein said well treatment fluid further comprises a metal chelating agent.

13. The method of claim 1, wherein said well treatment fluid is a spacer fluid, and said method further comprises:
 a) prior to introducing said well treatment fluid into said well, introducing a first fluid into said well, said first fluid being different in composition than said well treatment fluid;
 b) prior to introducing said well treatment fluid into said well, placing a cylindrical conduit into the wellbore, wherein said conduit has an outside diameter that is less than the diameter of the wellbore such that an annulus is formed between the exterior of said conduit and the wall of the wellbore; and
 c) in connection with introducing said well treatment fluid into said wellbore, circulating said well treatment fluid through said conduit and said annulus to displace said first fluid therefrom; and
 d) after circulating said well treatment fluid through said conduit and said annulus, introducing a second fluid into said well, said second fluid being different in composition than said first fluid and said well treatment fluid.

14. The method of claim 13, wherein said first fluid is a drilling fluid, said second fluid is a hydraulic cement composition, and said well treatment fluid is a cement spacer fluid.

15. The method of claim 13, wherein said well treatment fluid is circulated downwardly through the interior of said conduit, out an end of said conduit and upwardly through said annulus to the surface.

16. The method of claim 13, wherein said conduit is a casing.

17. The method of claim 1, wherein said well treatment fluid is introduced into the well using one or more pumps.

18. A method of cementing a casing in a well, comprising:
 a) placing a cylindrical casing into the wellbore, wherein said casing has an outside diameter that is less than the diameter of the wellbore such that an annulus is formed between the exterior of said casing and the wall of the wellbore; and
 b) after placing said casing into said wellbore, circulating a cement spacer fluid downwardly through the interior of said casing, out of an end of said casing, and upwardly through said annulus to the surface, said cement spacer fluid comprising:
  an aqueous base fluid;
  a bridging agent wherein said bridging agent is a nutshell;
  a viscosifying agent selected from the group consisting of one or more gums, one or more clays, and combinations thereof; and
  a water soluble, biodegradable, graft copolymer, said graft copolymer comprising:
   a grafting base selected from the group consisting of lignin, tannin, and humic acid;
   a first monomer component grafted onto said grafting base, said first polymer component being selected from the group consisting of acrylamido-2-methyl propane sulfonic acid, acrylic acid, acrylamide, vinyl acetic acid, methacrylic acid, dimethyl methacrylate, and combinations thereof; and
   a second monomer component grafted onto said grafting base, said second monomer component being an organic compound selected from the group consisting of gelatin, collagen, casein, soy protein, and combinations thereof;
  wherein the combination of aqueous base fluid, bridging agent viscosifying agent, and graft copolymer is effective as a fluid loss control fluid within the well;
 c) after circulating said cement spacer fluid downwardly through the interior of said casing, out an end of the casing, and upwardly through said annulus to the surface, circulating a hydraulic cement composition downwardly through the interior of said casing, out an end of the casing, and upwardly into said annulus; and
 d) allowing said hydraulic cement composition to set in said annulus thereby forming an annular sheath of hardened cement therein.

* * * * *